US006547999B1

(12) United States Patent
Ducharme, Jr. et al.

(10) Patent No.: US 6,547,999 B1
(45) Date of Patent: Apr. 15, 2003

(54) CELLULOSE FOOD CASING, CELLULOSE COMPOSITION AND PRODUCTION METHOD THEREFOR

(75) Inventors: Paul Edmund Ducharme, Jr., Tinley Park, IL (US); Myron Donald Nicholson, Lemont, IL (US); Norman Abbye Portnoy, Naperville, IL (US)

(73) Assignee: Viskase Corporation, Willowbrook, IL (US)

( * ) Notice: Subject to any disclaimer, the term of this patent is extended or adjusted under 35 U.S.C. 154(b) by 0 days.

(21) Appl. No.: 09/419,933

(22) Filed: Oct. 18, 1999

(51) Int. Cl.$^7$ .............................. C08L 1/02; D21H 11/18
(52) U.S. Cl. ..................... 264/118; 428/34.8; 241/28; 106/164.01; 426/138; 426/135
(58) Field of Search ............................... 428/34.8, 35.6; 426/135, 138; 106/163.01, 164.01; 264/37.2, 561, 118; 241/28

(56) References Cited

U.S. PATENT DOCUMENTS

| | | | | |
|---|---|---|---|---|
| 3,956,512 A | * | 5/1976 | Higgins | 426/140 |
| 4,142,913 A | | 3/1979 | McCorsley, III | 106/186 |
| 4,196,282 A | | 4/1980 | Franks | 536/56 |
| 5,094,690 A | * | 3/1992 | Zikeli et al. | 106/198 |
| 5,236,726 A | * | 8/1993 | Lancaster | 426/135 |
| 5,413,631 A | * | 5/1995 | Gray et al. | 106/156 |
| 5,421,525 A | * | 6/1995 | Gray et al. | 241/19 |
| H1592 H | | 9/1996 | Nicholson | |
| 5,603,884 A | | 2/1997 | DuCharme, Jr. | |
| 5,656,224 A | | 8/1997 | Zikeli | 264/207 |
| 5,744,251 A | | 4/1998 | DuCharme, Jr. | |
| 5,747,125 A | * | 5/1998 | Markulin | 428/34.8 |
| 5,942,167 A | * | 8/1999 | DuCharme, Jr. | 264/37.2 |
| 6,096,258 A | * | 8/2000 | DuCharme, Jr. et al. | 264/561 |
| 6,264,874 B1 | * | 7/2001 | Nielsen | |
| 6,319,457 B1 | * | 11/2001 | DuCharme, Jr. et al. | |

FOREIGN PATENT DOCUMENTS

| | | |
|---|---|---|
| JP | 5311600 A | 11/1993 |
| WO | WO 94/28216 | 12/1994 |
| WO | WO 94/28233 | 12/1994 |
| WO | WO 94/28234 | 12/1994 |

* cited by examiner

Primary Examiner—Harold Pyon
Assistant Examiner—Sow-Fun Hon
(74) Attorney, Agent, or Firm—Roger Aceto; Donna Bobrowicz

(57) ABSTRACT

The present invention provides a method of preparing a cellulose solution suitable for extrusion as a seamless tubular film by providing a pulp of substantially open-ended fibrillated softwood fibers having a mean fiber length less than 2.0 mm and then dissolving the pulp in a suitable solvent to produce the cellulose solution. In addition, the present invention provides a method of preparing a cellulose food casing from a cellulose solution of the present invention.

9 Claims, No Drawings

CELLULOSE FOOD CASING, CELLULOSE COMPOSITION AND PRODUCTION METHOD THEREFOR

FIELD OF THE INVENTION

The present invention relates to cellulose food casings, cellulose compositions, and production methods therefor.

BACKGROUND OF THE INVENTION

Cellulose food casings are well known in the art and are widely used in the production of stuffed food products such as sausages and the like. Cellulose food casings generally are seamless tubes formed from regenerated cellulose and contain a plasticizer such as water and a humectant such as a polyalkylene oxide, a polyalkylene glycol, and/or a polyol such as glycerin. Typically, plasticization is required because otherwise the cellulose tube is too brittle for handling and commercial use.

Cellulose food casings generally are used in one of two forms. In one form the casing consists of a tubular film of pure regenerated cellulose having a wall thickness ranging from about 0.025 mm to about 0.076 mm and is made in tube diameters of about 14.5 mm to 203.2 mm. The second form is a reinforced casing wherein the tubular wall of the casing consists of regenerated cellulose bonded to a paper web. Such reinforced casings are commonly called "fibrous" casings to distinguish them from the non-reinforced cellulose casings. Fibrous casings have a wall in the range of 0.050 mm to 0.102 mm thick and are made in diameters of about 40.6 mm to 193 mm or greater.

The cellulose for making both types of casings is most commonly produced by the so called "viscose process" wherein viscose, a soluble cellulose derivative, is extruded as a tubular film through an annular die into coagulating and regenerating baths to produced a tube of regenerated cellulose.

The viscose process for making cellulose is well known in the art. Briefly, in the viscose process a natural cellulose source (e.g., wood pulp or cotton linters) is treated with a caustic solution to form alkali cellulose. The alkali cellulose then is reacted with carbon disulfide to form cellulose xanthate which is a cellulose derivative. The cellulose xanthate is dissolved in a weak caustic solution. The resulting solution or "viscose" is ripened, filtered, deaerated and extruded.

For food casing the viscose is extruded as a tube into coagulation and regenerating baths containing salts and sulfuric acid. In the acidic bath the cellulose xanthate, e.g. viscose, is converted back to cellulose. In this respect, the acid bath decomposes the cellulose xanthate in a chemical reaction with the result that a pure form of cellulose is coagulated and regenerated.

Initially, the coagulated and regenerated cellulose is in a gel state. In this gel state the cellulose tube first is run through a series of rinse water dip tanks to remove by-products formed during regeneration. The gel tube then is treated with a glycerin humectant and dried to about 10% moisture or less based on total casing weight. The gel tube preferably is inflated during the drying process to a pressure sufficient to provide a degree of orientation to the dried cellulose tube.

Both nonreinforced cellulose casings and fibrous casings are produced in this fashion except in the case of fibrous casings the viscose is extruded onto a tube of paper prior to entering the coagulation and regenerating baths.

An alternate cellulose production method involves forming a cellulose solution by means of a simple dissolution rather than requiring prior derivatization to form a soluble derivative (as in the viscose process). This avoids drawbacks normally attendant to the viscose process such as the problems associated with the generation of gases and sulfur compounds during the chemical reactions to derivative and regenerate the cellulose.

U.S. Pat. No. 2,179,181 describes the dissolution of natural cellulose by a tertiary amine oxide to produce solutions of relatively low solids content, for example 7 to 10% by weight cellulose dissolved in 93 to 90% by weight of the tertiary amine oxide. The cellulose in the resulting solution is nonderivatized (i.e., it is not derivatized prior to dissolution). U.S. Pat. No. 3,447,939 discloses use of N-methylmorpholine-N-oxide (NMMO) as the cyclic amine oxide solvent wherein the resulting solutions, while having a low solids content, nevertheless can be used to precipitate the cellulose to form a film or filament.

More recent patents such as U.S. Pat. Nos. 4,145,532 and 4,426,288 improve upon the teachings of the '939 patent. U.S. Pat. No. 4,145,532 discloses a process for making a solution of cellulose in a tertiary amine oxide such as NMMO which contains 10–35% by weight of cellulose. The higher solids content, achieved in part by including an amount of water (from 1.4% to about 29% by weight) in the tertiary amine oxide solvent, provides a solution adapted for shaping into a cellulosic article such as by extrusion or spinning. In U.S. Pat. No. 4,426,288, the NMMO-cellulose solution contains an additive which reduces decomposition of the cellulose polymer chain so that molding or spinning substances are obtained with only slight discoloration and which will yield molded shapes distinguished by improved strengths upon precipitation in a nonsolvent such as water. U.S. Pat. No. 5,707,783 describes the use of nonderivatized cellulose solutions in the production of nonreinforced and reinforced cellulose food casing.

However, while nonderivatized cellulose resulting from the process of dissolving cellulose in NMMO eliminates certain problems associated with the viscose process, significant obstacles remain regarding the commercial production of nonderivatized cellulose for use in the production of cellulose food casing.

Among the numerous challenges involved in the manufacture of cellulose food casing is the practical utilization of alternative natural cellulose sources. Wood pulp is a common source of cellulose in the viscose process. The wood source from which the pulp is obtained is significant in the viscose process. Morphologically, wood is a heterogeneous cellular structure consisting of zones or annular rings, each representing the radial or transverse growth for a single year.

Generally, hardwoods are distinguished from softwoods. Hardwoods typically include the broad-leafed species, also known as the angiosperms. Examples of hardwoods include the oaks, poplars, ashes, gums, and birches. By contrast, softwoods typically include the needle-leafed species, also known as the gymnosperms. Examples of softwoods include pines, firs, hemlocks and spruces. Hardwoods and softwoods share some similarities. The relative sizes of the cell cavities of wood are quite variable in both the longitudinal and transverse direction relative to the longitudinal axis of the tree for both hardwoods and softwoods. Thus, both softwoods and hardwoods have cellular systems arranged both longitudinally and perpendicularly to the vertical axis of the tree.

The longitudinal vertically oriented fibers in hardwoods are separated by vessels that have relatively large diameters compared to the fibers themselves. Also in hardwoods, there are short ray cells arranged with their long axis oriented radially in the tree. By contrast, the longitudinal fibers in softwoods are more regularly aligned than the fibers in hardwoods. Moreover, softwood fibers have short blunt ray cells oriented in the transverse direction. There are other significant differences between hardwoods and softwoods, particularly in the structure and composition of the fibers that lend to their use either in the viscose process or in the NMMO solvent process.

Hardwood fibers are much shorter than softwood fibers. Hardwood fiber length varies between species but generally, on average, hardwood fibers are about 1.5 mm long. Softwood fibers, on average, generally are about 3.5 mm long and even much longer in some species. Hardwood fibers also have a higher content of hemicelluloses (i.e., short or incompletely formed cellulose chains or selected alkali soluble sugar residues) than soft wood fibers. The molecular weight of hardwood fibers also is lower than softwood fibers.

The properties of softwood fiber promotes the use of a softwood pulp in the viscose process for making casings as opposed to the use of hardwood pulp whereas the properties of hardwood fiber promote its use in the NMMO-solvent process. For example, hemicellulose is problematic in the viscose process because it competes with cellulose in the derivatization step by reacting with the carbon disulfide derivatizing agent. The competitive reaction of hemicellulose in hardwood pulps with carbon disulfide prevents the cellulose from being completely derivatized and renders the cellulose less soluble. So called "gels" are formed that require removal by filtering. Using softwood fibers overcomes many of the problems in the viscose process associated with hemicellulose because softwood fibers have a lower hemicellulose content.

Wicking and absorbency of the fibers also is critical in the viscose process. The short hardwood fibers (1.5 mm average length) wick poorly. Accordingly, in the viscose process softwood fibers (3.5 mm average length) are preferred because the longer fibers of softwood give superior wicking and caustic absorbency relative to hardwood fibers. Better wicking means that caustic is absorbed by the soft wood pulp faster in the initial steeping step. In the viscose process, refining of the softwood can be used to enhance the wicking and caustic absorbency of softwood fibers.

The long fiber length of softwood also provides a higher molecular weight as opposed to hardwood which is another desirable property that promotes the use of softwood pulp in making sausage casings. Thus, for the reasons noted above, (better wicking, low hemicellulose, high molecular weight) softwood pulp (or cotton) is generally preferred in the viscose process for making sausage casings. In fact, softwood pulps have become the primary source of cellulose in the viscose process.

In contrast, the properties of hardwood fiber makes it preferred for use in the NMMO-solvent process. The shorter fiber length and higher hemicellulose content allow for rapid dissolution of the hardwood pulp. Its lower molecular weight produces a solution that is less viscous and easier to pump than a softwood solution. However, while hardwood pulp is used commercially in the production of staple fibers and filaments using the NMMO-solvent process, the low molecular weight of hardwood fiber makes hardwood pulps undesirable for use in making sausage casings.

While softwood also is the pulp of choice for making sausage casing with the NMMO solvent, there are drawbacks to such use. Thus, despite the refinements in softwood fibers for the viscose process, softwood pulps have remained impractical for use in the commercial production of cellulose food casing via nonderivatized cellulose solutions.

For example, softwood pulp is sold in sheet form. The sheet is relatively hard and stiff due to the interlocking of the long softwood fiber making up the sheet. These hard, stiff sheets steep very well in the caustic for purposes of the viscose process. However, for purposes of the NMMO-solvent process, these sheets must be broken down to smaller pieces for mixing with the NMMO solvent. One way to do this is to pick the sheet apart in a manner which leaves the long softwood relatively intact. Another way is to comminute the sheet by shredding or dicing it into small pieces. However, the hard stiff commercial pulp sheets of softwood fibers shred and dice very poorly relative to sheets derived from hardwood fibers. In some cases, the shredding of softwood fibers causes the mechanical apparatus to stop or overheat.

Even when comminuting is successful, the mass of shredded pulp is not suitable for commercial production. The pieces resulting from shredding the softwood sheet have been found to have crimped or crushed edges that retard the entry of the NMMO solvent. When a slurry of the pulp and NMMO solvent is made, time constraints (residence time in the dissolution unit) often prevents the complete dissolution of the softwood fibers. The resulting solution may contain large clumps of undissolved fibers and swollen gels are produced, making the solution unsuitable for filtration and/or extrusion as a seamless film. Moreover, softwood pulps tend to produce a slurry that is not suitable for commercial production because softwood fibers allow the absorbed NMMO solvent to drain rapidly from the slurry upon pumping. This leaves a dry pulp mass that bridges outlets and plugs the lines that feed the slurried mass into the dissolution unit.

As suggested above, an important consideration for purposes of the present invention is that the softwood pulp must be in a form allowing it to dissolve in the time allotted for dissolution in a commercial operation. For example, in a commercial application the softwood pulp is mixed with aqueous NMMO to form a thick slurry having the consistency of bread dough. This slurry is pumped to the dissolving unit where dissolution of the cellulose occurs. A preferred unit and process is generally described in U.S. Pat. No. 5,094,690. This dissolution unit, sometimes referred to as a filmtruder, comprises a vertical heated cylinder having an internal rotor with blades that wipe against the inner surface of the cylinder. In use, the slurry of cellulose and aqueous NMMO is introduced into the top of the heated cylinder. The rotor and blades move the slurry downward along the heated surface. During the course of this movement, the slurry is heated, water is evaporated and the solvent is concentrated to the point where dissolution of the cellulose occurs. The resulting solution, which has the consistency of a thick syrup, exits from a bottom outlet. The solution is thermoplastic in that it is solid at room temperature. While still molten, it is pumped to the extruders for extruding the solution as a tube. The residence time of the slurry in the filmtruder is often two minutes or less. Accordingly, for practical applications, there must be complete dissolution of the cellulose in this time.

In view of the foregoing problems, there exists a need for a food casing prepared from natural softwood fibers and a method of preparing a cellulose food casing therefrom. Moreover, there is a need for a composition containing natural softwood fibers, and a cellulose solution made from such fibers, useful in the production of a food casing of nonderivatized cellulose. The present invention provides such a food casing, a composition, a solution, and production methods therefor. These and other advantages of the present invention, as well as additional inventive features, will be apparent from the description of the invention provided herein.

SUMMARY OF THE INVENTION

The present invention provides a seamless tubular film of nonderivatized cellulose regenerated from an extruded thermoplastic composition which is a solution derived from an amine oxide solvent and substantially open-ended fibrillated softwood fibers having an average length of less than 2.0 mm.

By fibrillated it is meant that the fiber has been refined. Such refining is well known in the art and generally involves passing the wood fibers in the form of chips or pulp between grooved steel disks. The disks are rotated to mill the chips or pulp. In such milling operation, bundles of fibers making up the chip or pulp are separated into smaller fiber units. Such milling also can be made to abrade the fibers such that fibrils are pulled off from individual fibers. Processing equipment and methods causing fibrillation of wood fibers are well known in the art. For purposes of the present invention, a fibrillated softwood fiber, when examined under a microscope has fibrils or hair-like features extending from the surface of the fiber.

It is believed that the dissolution of the softwood fiber begins at the ends of the fiber. Each fibril provides another end or location where the solvent can access the fiber thus speeding its dissolution. Accordingly, a refined or fibrillated fiber is preferred for purposes of the present invention.

For purposes of the invention, it also is preferred that the softwood fiber be open-ended. By open-ended it is meant that the ends of the fibers are cut relatively cleanly and are not crimped or crushed. Thus, as described hereinbelow, the comminuting of a sheet to provide the smaller pieces or pulp for dissolution preferably is accomplished such that the edges of the pieces, including the fibers cut by the process, are cut cleanly and are not crimped or crushed by the comminuting process. Fibers having crushed or crimped ends do not readily dissolve because the fiber end is closed and the closed end bars access of the solvent.

For purposes of the present invention, a softwood fiber which has been reduced in length to 2.0 mm or less is preferred. This is because the short length, together with fibrillation and open ends allows rapid dissolution of the fiber. The refining operation to some extent will itself cause a reduction in fiber length. Softwood fibers having an average length of 2.5 mm or more can be reduced to 2.9 mm or less by refining. These fibers are then formed into a sheet for delivery to the casing maker. The sheets are then comminuted to smaller pieces for dissolution wherein the average fiber length is still further reduced.

The present invention further provides a composition for use in the manufacture of a nonderivatized cellulose food casing. The composition of the present invention includes substantially open-ended fibrillated softwood fibers having a mean fiber length of less than about 2.0 mm and a solvent comprising an amine oxide that is capable of dissolving the fibers.

The present invention also provides a method of preparing a cellulose solution suitable for extrusion as a seamless tubular film. The cellulose composition is prepared by providing a sheet composed of fibrillated softwood fibers having a mean fiber length of about 2.0 mm. The sheet is diced or shredded to produce a pulp or shredded mass of substantially open-ended fibrillated softwood fibers having a mean fiber length of less than about 2.0 mm. The pulp is then mixed with a suitable amine oxide-containing solvent in an amount sufficient to dissolve the cellulose to produce a solution of nonderivatized cellulose for extrusion as a seamless tubular film.

Moreover, the present invention provides a method of preparing a food casing of nonderivatized cellulose. The food casing is produced by preparing a cellulose solution in accordance with the present invention and extruding it as a seamless tube. The extruded tube is then passed into a nonsolvent bath and the amine oxide solvent is substantially removed from the extruded tube to produce a nonderivatized cellulose tube that is substantially free of the amine oxide. The cellulose tube is then dried and plasticized to produce the nonderivatized cellulose food casing.

DETAILED DESCRIPTION OF THE PREFERRED EMBODIMENTS

The present invention is predicated on the surprising and unexpected discovery that the problems associated with using softwood fibers in the large scale production of cellulose solutions can be overcome when softwood fibers are subjected to a refining process followed by mechanical fiber length reduction. When the long natural softwood fibers are shredded, the ends of the softwood fibers become severely crimped and/or closed as noted above, which is believed to contribute to the poor solubility typically associated with softwood fibers (e.g., by preventing solvent absorption into the fibers through the crimped edges). Interestingly, these problems are not overcome by shredding in a manner that avoids crimping and crushing of the edges. For example, a single pass of a sheet composed of long softwood fibers through a dicer can produce reduced-length softwood fibers without severely crimped and closed edges. However, slurries of such fibers drain rapidly upon pumping, causing bridging and plugging in the lines that feed the slurried mass into the dissolution unit. Bridging and plugging occurs even though the non-crimped diced fibers can satisfactorily absorb a suitable solvent (e.g., aqueous N-methylmorpholine-N-oxide) and exhibit reasonable solubility properties.

In the viscose process as noted above, refining of the softwood to fibrillate the fiber improves wicking of the caustic into the fibers. However, the improved wicking ability of the refined softwood fibers alone does not render the fibers suitable for production of nonderivatized cellulose food casing. Softwood fibers subjected to refining prior to forming sheets are not even soluble in aqueous N-methylmorpholine-N-oxide in the short time (usually two minutes or less) available for dissolution in a commercial process.

Surprisingly and unexpectedly, it was discovered that softwood pulp suitable for use in the commercial production of a nonderivatized cellulose food casing may be obtained by shredding a sheet formed of softwood fibers that have been reduced in length and subjected to refining prior to sheeting. In accordance with the present invention, sheets formed of softwood fibers reduced to a shorter fiber length by refining can be diced or shredded to form a still further reduced-length fibers suitable for use in the NMMO-solvent process. For example, pulp sheets of refined fibers having a mean fiber length reduced to about 2.0 mm can be crosscut shredded to a further reduced length of about 1.36 mm.

Surprisingly and unexpectedly, using a cross cutting shredding operation to comminute the sheet to smaller pieces in a manner that does not crush or crimp the edges of the smaller pieces was found to provide a shredded softwood pulp suitable for use in the NMMO solvent process. Such a cross cutting shredding operation that cuts through the softwood fibers to provide the cut fibers with open ends may be performed by a shredder sold by Dicer Corporation of Haverhille, Mass. under the trade name DICER 7000. In particular, the shredding operation using this equipment shortens the fiber length while leaving the ends of the fibers open rather than crimped or closed.

The open ends and shorter fiber length are believed to contribute to the rapid dissolution of the shredded pulp. In this respect, it is believed that the dissolution of individual fibers begins at the ends of the fibers. An open end allows the NMMO solvent better access than an end which is closed such as by crushing or crimping. Thus, it has been found that when the shredding of fibrillated fibers occurs without crimping and closing of the fiber ends, the resulting shredded softwood pulp can produce a slurry that retain the solvent and does not drain on pumping, thereby avoiding bridging or plugging in the feed lines. Further the shredded softwood pulp readily dissolves so that softwood fibers processed in this fashion can be used in the commercial production of nonderivatized cellulose solutions suitable for extrusion as a seamless food casing.

Refining itself results in some length reduction of softwood fibers. As indicated above, refining can reduce softwood fibers having a mean fiber length of about 2.4 mm or longer to fibers having a mean fiber length of about 2.0 mm. The fibers subjected to refining also become "fibrillated," as noted above, i.e., the action of refining or milling operation can be accomplished in a manner that pulls small, hair-like protrusions (fibrils) from the main longitudinal body of the fiber.

It is believed that the fibrillation improves the fibers' holding power with respect to the solvent (e.g., N-methylmorpholine-N-oxide), thereby promoting retention of the solvent liquid in the pulp until the dissolution step. Moreover, it was surprisingly and unexpectedly found that refined fibers can be crosscut shredded without acquiring pinched or crushed edges. Instead, the reduced length fibers were substantially open-ended.

The open-ended fibrillated softwood fibers used in the present invention exhibited excellent solvent retention and overcame the problem of bridging and plugging in the lines that feed the slurried mass into the dissolution unit. The fibrillated fibers also were readily soluble, avoiding the formation of fibrous bundles and swollen gels in the dissolution step This allows use of higher molecular weight softwood for the production of cellulose casings with the NMMO-solvent process.

Accordingly, the present invention provides a seamless tubular film of cellulose precipitated from an extruded thermoplastic composition formed of an amine oxide solvent and relatively short substantially open-ended fibrillated softwood fibers. The seamless tubular film of the present invention is preferably used as a cellulose food casing. The cellulose food casing of the present invention is typically sulfur-free in that the cellulose used to prepare it does not undergo derivatization with a derivatizing agent, such as carbon disulfide, that produces sulfur-containing by-products.

The softwood fibers of the present invention can be derived from any suitable softwood source, preferably needle-leafed plant sources of the gymnosperm species. More preferably, the fibers are derived from at least one softwood source selected from the group consisting of pines, firs, hemlocks, spruces, and the like. The fibrillated fibers preferably have a mean fiber length of less than about 2.0 mm. More preferably the fibers have a mean fiber length of less than about 1.8 mm, even more preferably about 1.5 mm or less, and most preferably about 1.4 mm or less (e.g., about 1.36 mm).

While any suitable amine oxide solvent can be used in the production of the food casing of the present invention, the amine oxide solvent is preferably N-methylmorpholine-N-oxide. Other amine oxide solvents are described, for example, in U.S. Pat. No. 4,255,300.

The food casing of the present invention can be a reinforced food casing or a non-reinforced food casing. The food casing of the present invention can include suitable additives, for example, plasticizers, softeners, and the like. When a plasticizer is used, it is preferably water, a polyalkylene oxide, a polyalkylene glycol, a polyol (e.g., glycerin), or a combination thereof. The food casing of the present invention also can include a suitable coating. Suitable coatings optionally include additives, for example, flavor enhancing agents, coloring agents, and/or texturizing agents. When a coating is used in the food casing of the present invention, the coating preferably includes at least one additive selected from the group consisting of peeling aids, coloring agents, flavoring agents, and the like.

The present invention further provides a composition for use in the manufacture of a cellulose food casing. The composition of the present invention includes substantially open-ended fibrillated softwood fibers having a mean fiber length of less than about 2.0 mm, and a solvent that is capable of dissolving the fibers. The composition can be in any suitable form, for example, a slurry, a dispersion, a suspension, or the like. The fibers preferably have a mean fiber length of less than about 2.0 mm, more preferably less than about 1.8 mm, even more preferably about 1.5 mm or less, and most preferably about 1.4 mm or less (e.g., 1.36 mm). The fibers of the composition of the present invention can be obtained from any suitable softwood source, including needle-leafed gymnosperm plant sources as described herein.

The solvent used in the composition of the present invention preferably comprises an amine oxide, which is more preferably an aqueous amine oxide solvent system. The solvent system is preferably one that is easily retained by the fibers so as to prevent the solvent from draining from the initial slurry during pumping, thereby avoiding bridging and plugging of the lines that feed the slurry into the dissolving unit. While any suitable amine oxide solvent can be used in the composition of the present invention, it is preferred that the solvent system used in the composition of the present invention is an aqueous N-methylmorpholine-N-oxide (NMMO) solvent system. Suitable aqueous NMMO solvent systems are disclosed, for example, in U.S. Pat. Nos. 5,658,524, 5,658,525, 5,766,540, and 5,702,783. Other amine oxide solvent systems are described, for example, in U.S. Pat. Nos. 4,196,282 and 4,255,300.

The present invention further provides a method of preparing a cellulose solution suitable for extrusion as a seamless tubular film. The cellulose composition is prepared by providing a sheet composed of fibrillated softwood fibers having a mean fiber length of at least 2.0 mm; comminuting the sheet by dicing or shredding to produce a pulp or shredded mass of substantially open-ended fibrillated softwood fibers having a mean fiber length of less than about 2.0 mm; dissolving the shredded mass in a suitable amine oxide solvent to produce a cellulose solution suitable for extrusion as a seamless tubular film. Typically, the pulp or shredded mass is slurried in the amine oxide solvent system, pumped into a dissolving unit, and heated until a cellulose solution is formed.

Preferably, the softwood pulp used for casing manufacture using the NMMO-solvent process has a molecular weight of about 600 to 700. A single pulp of the proper weight can be used or pulps of various molecular weights can be used to obtain one having the desired weight.

The fibrillated softwood fibers comprising the sheet can be obtained by any suitable method that results in the formation of fibrils extending from the main longitudinal body of the fiber. It is believed the fibrils stabilize the pulp in the sheet such that the fibers can be diced or shredded without the fiber edges becoming crimped or crushed. In a preferred embodiment, the fibrillated fibers of the sheet are obtained by refining as noted above. The fibers making up the sheet can be derived from any suitable softwood source, including those described herein.

The fibers of the sheet are subjected to a further mechanical fiber length reduction. Any suitable fiber length reduction process can be used in accordance with the present invention. Preferably, the fiber length reduction process involves dicing, shredding, or both dicing and shredding in any suitable order. In a preferred embodiment, the mean fiber length is reduced by crosscut shredding, and is most preferably done with a single pass through the shredder. In accordance with the present invention, the fiber length reduction produces a pulp composed of substantially open-ended fibrillated softwood fibers (i.e., wherein the fiber edges are not crimped or closed as result of fiber length reduction). The length of the fibers is preferably reduced to a mean fiber length of less than about 2.0 mm, more preferably less than about 1.8 mm, even more preferably about 1.5 mm or less, and most preferably about 1.4 mm or less (e.g., 1.36 mm). A preferred unit for reducing the fiber length is noted in the following examples.

The pulp is then mixed with a suitable solvent to form a slurry. The slurry is then processed to produce the cellulose solution. Preferably, the solvent is an amine oxide solvent system, but is more preferably an aqueous amine oxide, which is most preferably an aqueous N-methylmorpholine-N-oxide solvent system. Other amine oxide solvent systems are described, for example, in connection with the composition provided herein. The dissolution can be facilitated by any suitable method known in the art, for example, by agitation, ultrasound, heating, or any suitable combination thereof. In a preferred embodiment, the pulp is slurried in the solvent system, pumped as a slurry into a dissolving unit, and heated until a solution suitable for extrusion is obtained all in accordance with the method disclosed in U.S. Pat. No. 5,094,690.

The present invention further provides a method of preparing a cellulose food casing. The food casing is prepared by preparing a cellulose solution in accordance with the present invention. The cellulose solution is extruded as a seamless that is then passed into a nonsolvent bath. In the bath, the amine oxide cellulose solvent is substantially removed from the extruded tube, thereby regenerating a nonderivatized cellulose tube that is substantially free of the amine oxide. The cellulose tube is then dried and treated with a plasticizer and humectant to produce the cellulose food casing.

The softwood fiber used can be obtained by any suitable source, including those described herein. The fibrillated softwood fibers can be of any suitable mean fiber length, but preferably are 2 mm or less. Suitable fiber lengths are noted in the following samples. The amine oxide solvent can be any suitable amine oxide solvent or solvent system, including those described herein.

Any suitable method can be used in the formation of a seamless food casing in accordance with the present invention. Preferably, the extruded tube is passed through an air gap prior to passing the extruded tube into the nonsolvent bath as described, for example, in U.S. Pat. No. 5,702,783. The extruded tube can be formed in any suitable manner, for example, by way of a mandrel which is extensible from the extrusion die, as described in U.S. Pat. No. 5,766,540. The extruded tube can be internally cooled (e.g., with a liquid) while in the air gap, for example, as described in U.S. Pat. No. 5,658,524. The extruded tube also can be cooled in the air gap by exposing the extruded tube in the air gap to a flow of cooling air, for example, prior to its entering the nonsolvent bath as described in U.S. Pat. No. 5,658,525. The extruded tube also can be diametrically stretched while in the air gap, for example, by way of a mandrel positioned inside the extruded tube as described, e.g., in U.S. Pat. No. 5,759,478.

The extruded tube is then passed into a nonsolvent bath in which the nonderivatized cellulose is coagulated as a wet gel. The tube is preferably washed sufficiently to remove substantially all of the cellulose solvent from the walls of the extruded tube. Preferably, the tube is treated with a humectant, after the washing step but before drying. In a preferred embodiment, the humectant is a polyol, which is most preferably glycerin.

The resulting tube is then dried to produce a cellulose food casing. Preferably, the drying step is carried out while the tube is inflated with air at a pressure sufficient both to maintain a constant tube diameter and to orient the film.

EXAMPLES

The following examples further illustrate the present invention but, of course, should not be construed as in any way limiting its scope.

Example 1

This example demonstrates the preparation of a food casing in accordance with the present invention. A sheet of softwood pulp made of refined softwood fibers was obtained. The mean fiber length of the refined fibers in the sheet was about 2.0 mm (as compared to a fiber length of 2.5 mm or more for softwood fiber). The fibers were fibrillated as a result of the refining. The sheet was crosscut diced (one pass through the dicer) to commuinte the sheet and reduce fiber length. The resulting pulp, composed of reduced-length fibers had a mean fiber length of about 1.36 mm. Microscopic analysis of the reduced-length fibers unexpectedly revealed that the ends of the fibers are clean cut and open and are not crimped or closed off. The reduced-length fibers were then mixed with aqueous N-methylmorpholine-N-oxide (NMMO) to form a slurry. The fibers in the aqueous NMMO slurry were found to have excellent liquid retaining ability and the slurry could be pumped through the feed lines and into the upper end of the dissolving unit without drainage or separation of the solvent system from the slurry. Consequently, there was no bridging or plugging of the feed lines. Upon heating, passage downward through the unit and on the slurry was found to dissolve readily and produced a cellulose solution suitable for extrusion as a seamless film. Dissolution took place in a residence time of about two minutes which is suitable for a commercial operation. No swollen gels or fiber bundles were observed in the cellulose solution indicating that a substantially complete dissolution of the softwood occurred.

The cellulose solution was extruded as a seamless tube through an air gap and into a water bath. The extruded tube was washed with water until substantially all of the NMMO was removed, thereby producing a wet solvent-free (regenerated) nonderivatized cellulose tube. The wet solvent-free tube was then treated with a humectant and dried under inflation to produce a seamless tubular cellulose film suitable for use as a food casing. The seamless tube thus produced was of high quality and was suitable for commercial applications as a sausage casing.

Comparative Examples 1 to 5 illustrate the properties of various unrefined and refined softwood pulp samples after mechanical fiber length reduction. Pulp samples are provided in sheet form wherein Samples 1–5 use sheets of unrefined softwood whereas Sample 6 (invention embodiment) uses a sheet of refined softwood. After comminuting the sheet, microscopic examination of fibers is made to determine the state of the ends of the fibers. Aqueous N-methyl-morpholine-N-oxide (NMMO) is used to form a slurry of the reduced length fibers. Each aqueous NMMO slurry is heated in a dissolution unit to dissolve the fibers in the slurry and produce a cellulose solution. An evaluation of the slurries and resulting solutions is shown in Table 1.

In each of Samples 1–5, the sheet provided is composed of an unrefined softwood pulp having a fiber length of about 2.4 mm. Samples 1–4 show a mechanical fiber length reduction of the sheet as performed by a shredder that shreds the sheet both lengthwise and transversely (cross cut shredding) in a single pass. The shredder, sold by Olympia USA, Inc. of Dallas, Texas under the name OLYMPIA 5066C commutes the sheet in a manner which crimps or crushes the edges of the pieces. Sample 1 shows a fiber length reduction of from the original 2.40 mm length to 2.12 mm in a single pass. Four passes (Sample 4) reduces the fiber length to 1.21 mm.

Comparative Sample 5 also of an unrefined softwood, shows a mechanical length reduction of the sheet as performed by a shredder sold by Dicer Corp. of Haverhill MA under the name DICER 7000. This also shreds both lengthwise and transversely but in a manner that cleanly cuts the pieces so the edges are open and not crushed or crimped.

In each of these cases and regardless of the resulting fiber length, the unrefined softwood was not suitable. In all these samples the NMMO solvent drained from the slurry on pumping and dissolution was poor.

In Sample 6, which is an embodiment of the present invention the sheet is composed of a refined softwood wherein the refining process pulls hair-like fibrils from the body of the fiber. The initial mean fiber length of the refined soft wood fibers comprising the sheet is about 2.0 mm as opposed to the mean length of about 2.5 mm for the unrefined fiber. This length is reduced to about 1.36 mm in a single pass through the shredder (DICER 7000) which comminutes the sheet into pieces having cut edges, the cut ends of the fiber being open and are not crushed or crimped.

TABLE 1

| No | Pulp Source | Fiber Length Reduction Method | Fiber Appearance (Microscope) | Slurry Properties | Mean Fiber Length (mm) | Dissolution Properties |
|---|---|---|---|---|---|---|
| 1 | Unrefined Softwood | Crosscut Shredded (1 pass) | pinched, crushed edges | slurry separated on pumping | 2.12 | very poor, gels, swollen fiber bundles |
| 2 | Unrefined Softwood | Crosscut Shredded (2 passes) | pinched, crushed edges | slurry separated on pumping | 1.80 | poor, swollen fiber bundles |
| 3 | Unrefined Softwood | Crosscut Shredded (3 passes) | pinched, crushed edges | slurry separated on pumping | 1.65 | better dissolution but swollen gels |
| 4 | Unrefined Softwood | Crosscut Shredded (4 passes) | pinched, crushed edges | slurry separated on pumping | 1.21 | better dissolution but swollen gels |
| 5 | Unrefined Softwood | Dicer Shredded (1 pass) | edges not pinched and crushed | slurry separated on pumping | 1.7 | fair dissolution |
| 6 | Refined | Crosscut Shredded (1 pass) | fibrillated, edges not pinched and crushed | no separation on pumping | 1.36 | excellent dissolution, no fiber bundles or swollen gels |

The data in Table 1 indicates that the pulps obtained by shredding sheets of unrefined softwood fibers is unsuitable for use in the commercial production of cellulose food casings. Even Sample 4, having an average fiber length of only 1.21 mm was not suitable for use due to gel formation. The solutions obtained from crosscut shredded unrefined softwood fibers gave fibrous bundles or swollen gels, even after multiple passes through the shredder (Samples 2–3). The ends of the crosscut shredded unrefined softwood fibers were pinched and crushed, and the solutions obtained therefrom were unsuitable for extrusion even when reduced to a fiber length as short as 1.21 mm (Sample 4).

Although the dicer shredded unrefined softwood pulp of Sample 5 produces fairly soluble reduced-length fibers without pinched or crushed edges, the slurry is unstable and unsuitable for use in commercial production because the solvent drains from the slurry on pumping. The solvent retaining ability of the slurry of all the unrefined diced fibers is poor in that the solvent drains on pumping causing bridging and plugging in lines that fed the slurry into the dissolving unit.

By contrast, when the refined softwood fibers (fibrillated fibers having a mean length of 2.0 mm) is dicer shredded only once (Sample 6 of Table 1) to provide an average fiber length of about 1.36 mm, the slurry obtained from the resulting fibers has excellent water retaining ability and can be pumped through the feed lines without bridging or plugging. Moreover, the reduced length refined fibers of Sample 6 (an embodiment of the invention) dissolve readily without the formation of swollen gels or fibrous bundles. This is attributed to the pieces having edges that are not pinched or crushed such that the cut ends of the fibers are open. These fibers produce a slurry and solution suitable for use in commercial production.

From Table I it is seen that merely reducing the fiber length to an average length below 2.0 mm is not sufficient to produce an acceptable softwood pulp. Samples 2–5 are all well below a fiber length of 2.0 mm and still are not acceptable. However, when a refined softwood fiber is used having an initial length of about 2.0 mm which is then combined with a further mechanical operation to reduce the fiber length to less than 2.0 mm, an acceptable pulp is obtained. In accordance with Sample 6 of Table I, this is accomplished by providing a sheet composed of refined softwood fibers having an average length of about 2.0 mm and then shredding this sheet into small pieces thereby providing a pulp composed of fibers having an average length of less than 2.0 mm and preferably an average length of 1.36 mm or less. It further is preferred that the process of comminuting the sheet to provide the further length reduction of the fibers be accomplished in a manner which cuts the fibers so as to leave the fibers with open ends as opposed to a crimped or crushed ends.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of preparing a nonderivatized cellulose solution for extrusion as a seamless tubular film, said method comprising:

providing fibrillated softwood fibers having a mean fiber length of about 2.0 mm or greater wherein the fibers are derived from the group consisting of pines, firs, hemlocks and spruces;

comminuting said softwood fiber to produce a pulp comprising fibrillated softwood fibers having a mean fiber length of less than about 2.0 mm and having ends which are open such that said ends are not crimped or crushed; and dissolving said pulp in a solvent comprising an amine oxide to produce said cellulose solution.

2. The method of claim 1, wherein said pulp is composed of fibers having a mean fiber length of about 1.4 mm or less.

3. The method of claim 1, wherein said amine oxide solvent is N-methylmorpholine-N-oxide.

4. A method of preparing a nonderivatized cellulose food casing, said method comprising:

preparing a cellulose solution in accordance with the method of claim 1;

extruding said cellulose solution as a seamless tube film to produce an extruded tube;

passing said extruded tube into a nonsolvent bath and removing said amine oxide from said extruded tube to produce a cellulose tube substantially free of said amine oxide and drying said cellulose tube under inflation to produce said cellulose food casing.

5. The method of claim 4, wherein the fibers used in preparing said cellulose solution have a mean fiber length of about 1.4 mm or less.

6. The method of claim 4, wherein said amine oxide solvent used in preparing said cellulose solution is N-methylmorpholine-N-oxide.

7. The method of claim 4, further comprising passing said extruded tube through an air gap prior to passing said extruded tube into said nonsolvent bath.

8. The method of claim 7, further comprising internally cooling said extruded tube in said air gap.

9. The method of claim 7, further comprising exposing said extruded tube in said air gap to a flow of cooling air for cooling said extruded tube in said air gap prior to passing said extruded tube into said nonsolvent bath.

* * * * *